United States Patent [19]
Jobling et al.

[11] Patent Number: 4,642,531
[45] Date of Patent: Feb. 10, 1987

[54] TIMEBASE CIRCUIT

[75] Inventors: David T. Jobling, Geneva; Anthony D. Newton, Le Vaud, both of Switzerland

[73] Assignee: Motorola Inc., Schaumburg, Ill.

[21] Appl. No.: 739,949

[22] Filed: May 31, 1985

[30] Foreign Application Priority Data

Jun. 5, 1984 [GB] United Kingdom ............... 8414316

[51] Int. Cl.⁴ ............................................. H01J 29/56
[52] U.S. Cl. .................................................. 315/371
[58] Field of Search ...................... 315/370, 371, 368

[56] References Cited

U.S. PATENT DOCUMENTS

| | | | |
|---|---|---|---|
| 3,187,218 | 6/1965 | E'Del ................................. | 315/368 |
| 3,725,726 | 4/1973 | West .................................. | 315/371 |
| 4,063,133 | 12/1977 | Nero et al. ......................... | 315/370 |
| 4,063,134 | 12/1977 | Iida .................................... | 315/371 |
| 4,258,298 | 3/1981 | Hilburn et al. .................... | 315/382 |

Primary Examiner—James J. Groody
Assistant Examiner—Cynthia Smith
Attorney, Agent, or Firm—Vincent B. Ingrassia

[57] ABSTRACT

A timebase circuit is described for providing a horizontal drive correction waveform to correct for pincushion distortion in which a parabolic correction current is derived by squaring a current proportional to the difference between the instantaneous and average values of the vertical ramp voltage. The correction current may be tilted by combination with a linear current proportional to the ramp voltage and may also be amplitude controlled.

11 Claims, 1 Drawing Figure

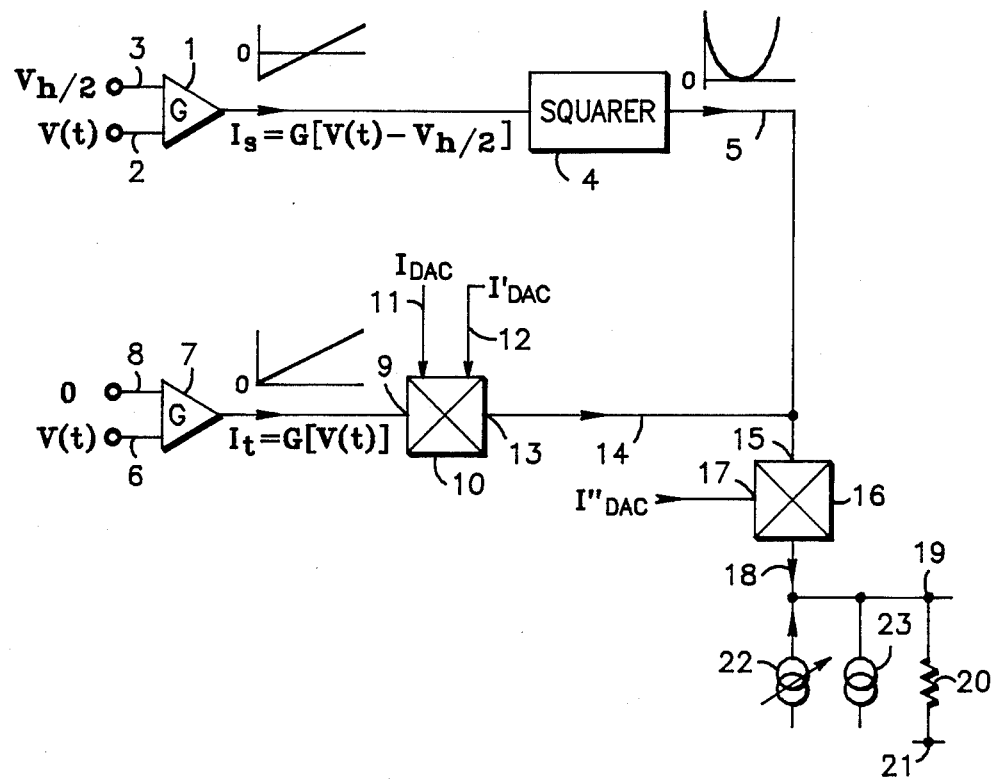

TIMEBASE CIRCUIT

FIELD OF INVENTION

The present invention relates to a timebase circuit and is particularly, although not exclusively applicable to a circuit for a television receiver.

BACKGROUND ART

The horizontal deflection of the electron beam of a television picture tube is provided by means of a timebase circuit which generates a sawtooth waveform.

It is well known that the use of a constant amplitude sawtooth waveform would result in the resulting picture suffering pincushion distorion.

This distortion is related to the vertical position of the electron beam and therefore a correction derived from the vertical timebase wavefrom needs to be superimposed onto the horizontal timebase waveform.

It is known to generate the correction waveform by components located in the vertical drive circuit. Typically a large capacitor is connected in series with the vertical deflection coils to generate a parabolic waveform by integrating the vertical ramp current.

A problem with this known circuit for providing the correction waveform is that the resulting correction current is not adjustable. The amount of correction can only be changed by changing external vertical drive components and in general will not be symmetrical about the centre of the tube. Also the large value capacitior has a very poor tolerance typically +50%, −25%.

The present invention seeks to provide a timebase circuit in which the above mentioned disadvantages of the known circuit are mitigated.

BRIEF DESCRIPTION OF INVENTION

In accordance with the present invention a parabolic horizontal drive correction waveform is derived which is proportional to the square of the vertical deflection of the picture tube electron beam from its central and undeflected position.

In an embodiment of the invention the parabolic correction waveform is derived by squaring a current proportional to the difference between the instantaneous vertical ramp voltage and its average valve.

In a preferred embodiment of the invention a current proportional to the vertical ramp voltage is combined with the parabolic correction current to provide a parabolic correction current waveform which may be titled.

BRIEF DECRIPTION OF DRAWINGS

An exemplary embodiment of the invention will now be described with reference to the single figure drawing which illustrates schematically a timebase circuit in accordance with the present invention.

DETAILED DESCRIPTION OF THE INVENTION

In the drawing a differential amplifier 1 having a transconductance G has input terminals 2 and 3. The input terminal 2 is connected to receive the instantaneous vertical ramp voltage V(t) whilst the terminal 3 receives a voltage $V_h/2$ which is the average value of the vertical ramp voltage ie the vertical vertical ramp voltage when the picture tube electron beam is in the central undeflected position.

The amplifier 1 provides an output current $I_D$ which is proportional to the difference between the instantaneous ramp voltage and the average voltage applied to the terminals 2 and 3 respectively. The current $I_D$ is squared by means of a squarer circuit 4 to provide an output current at line 5 which is parabolic with time.

In order to tilt the parabola the current appearing on the line 5 is combined with a current which is proportional to the instantaneous vertical ramp voltage. The ramp voltage is applied to a first input terminal 6 of a differential amplifier 7 of transconductance G a second input terminal 8 of which is connected to ground.

The amplifier 7 provides an output current $I_t$ which is proportional to the instantaneous ramp voltage and this current is fed to an input 9 of a four quadrant multiplier 10. Second inputs 11 and 12 of the multiplier 10 are fed with respective reference currents $I_{DAC}$ and $I'_{DAC}$ each derived from a digital to analogue converter in response to a digital code applied to the input of the converter. The digital code is a predetermined code derived to enable a satisfactory correction current to be derived which is suitable for the particular characteristics of the deflection circuits.

The multiplier 10 being a four quadrant multiplier provides either a positive or a negative output current at its output 13 in dependence upon which of the currents $I_{DAC}$ and $I'_{DAC}$ is the greater. The choice of a positive or negative current at the output of the multiplier 10 enables a positive or negative tilt to be imparted to the parabolic current.

The current supplied at the output 13 of the multiplier 10 is fed over line 14 to be combined with the parabolic output current fed from the squarer 4. The combined tilted parabolic correction current is applied to an input 15 of a further multiplier 16, a second input 17 of which is fed with a current $I''_{DAC}$ derived from an digital to analogue converter in response to a preselected digital code fed to the converter. The multiplier 16 is operative to impart an amplitude control to the tilted parbolic correction current and this amplitude controlled correction current is fed to a terminal 19.

A resistor 20 is coupled between the terminal 19 and a reference terminal 21, typically an earth terminal and converts the current applied to the terminal 19 into a voltage. This voltage may then be applied as required as a correction voltage for the horizontal timebase.

A further two currents supplied by sources 22 and 23 may be fed to the terminal 19. The source 22 provides a preset picture width control current whilst the current source 23 may provide a correction current for correcting changes in the picture with due to changes in picture tube EHT voltage the and forms the subject of a separate application.

The invention is particularly applicable to fabrication as part of an integrated circuit and all the illustrated elements of the invention with the exception of the resistor 20 may be integrated. The invention is particularly suitable for fabrication as part of a single chip television signal processing circuit.

Modifications may be made to the invention without departing from its scope. In particular although the reference currents supplied to the multipliers 10 and 16 are illustrated as being derived from the outputs of digital to analogue converters, this is not essential and any convenient means of supplying suitable reference currents could be used. The use of the digital to analogue converters is nevertheless particularly advantageous when the invention forms part of a micro-processor controlled single chip television signal processing circuit.

Although the invention has been described with reference to the correction of the horizontal timebase of a domestic television receiver the invention is equally applicable to any television type display such as a monitor, a computer display or a graphics display.

I claim:

1. A timebase circuit for providing a horizontal drive correction waveform for a television type display, the circuit comprising;
   first means responsive to a vertical ramp signal for providing a current proportional thereto;
   second means for squaring said current to provide a parabolic current;
   third means responsive to said vertical ramp signal for providing a linear current proportional thereto; and
   fourth means for combining said parabolic and linear currents to provide a tilted parabolic current.

2. The circuit of claim 1 wherein the first means comprises means for providing a current proportional to the difference between the instantaneous and average values of the vertical ramp voltage.

3. The circuit of claim 1 wherein the first means comprises first differential amplifying means having first and second inputs for receiving respectively the instantaneous vertical ramp voltage and the average vertical ramp voltage.

4. The circuit of claim 1 wherein the third means comprises second differential amplifying means having a first input for receiving the vertical ramp voltage and a second input for receiving a reference voltage.

5. The circuit of claim 1 wherein means is provided for adjusting the sign of the linear current to provide a positive or negative current to impart a positive or negative tilt to the tilted parabolic current.

6. The circuit of claim 5 wherein the means for adjusting the sign of the linear current comprises multiplying means having a first input for receiving the linear current and second and third inputs for receiving respective reference currents the sign of the linear current being dependent upon which of the reference currents is the greater.

7. The circuit of claim 6 wherein the reference currents are supplied by digital to analogue converter means in response to digitally coded input signals.

8. The circuit of claim 1 wherein means is provided for adjusting the amplitude of the correction waveform.

9. The circuit of claim 8 wherein the means for adjusting the amplitude of the correction waveform comprises multiplier means for multiplying the waveform by a reference current.

10. The circuit of claim 9 wherein the reference current is supplied by digital to analogue converter means in response to digitally coded input signals.

11. The circuit of claim 1 and fabricated in integrated circuit form.

* * * * *